L. B. MAY.
POWER TRANSMISSION DEVICE.
APPLICATION FILED JAN. 2, 1909.
981,096.
Patented Jan. 10, 1911.
2 SHEETS—SHEET 1.
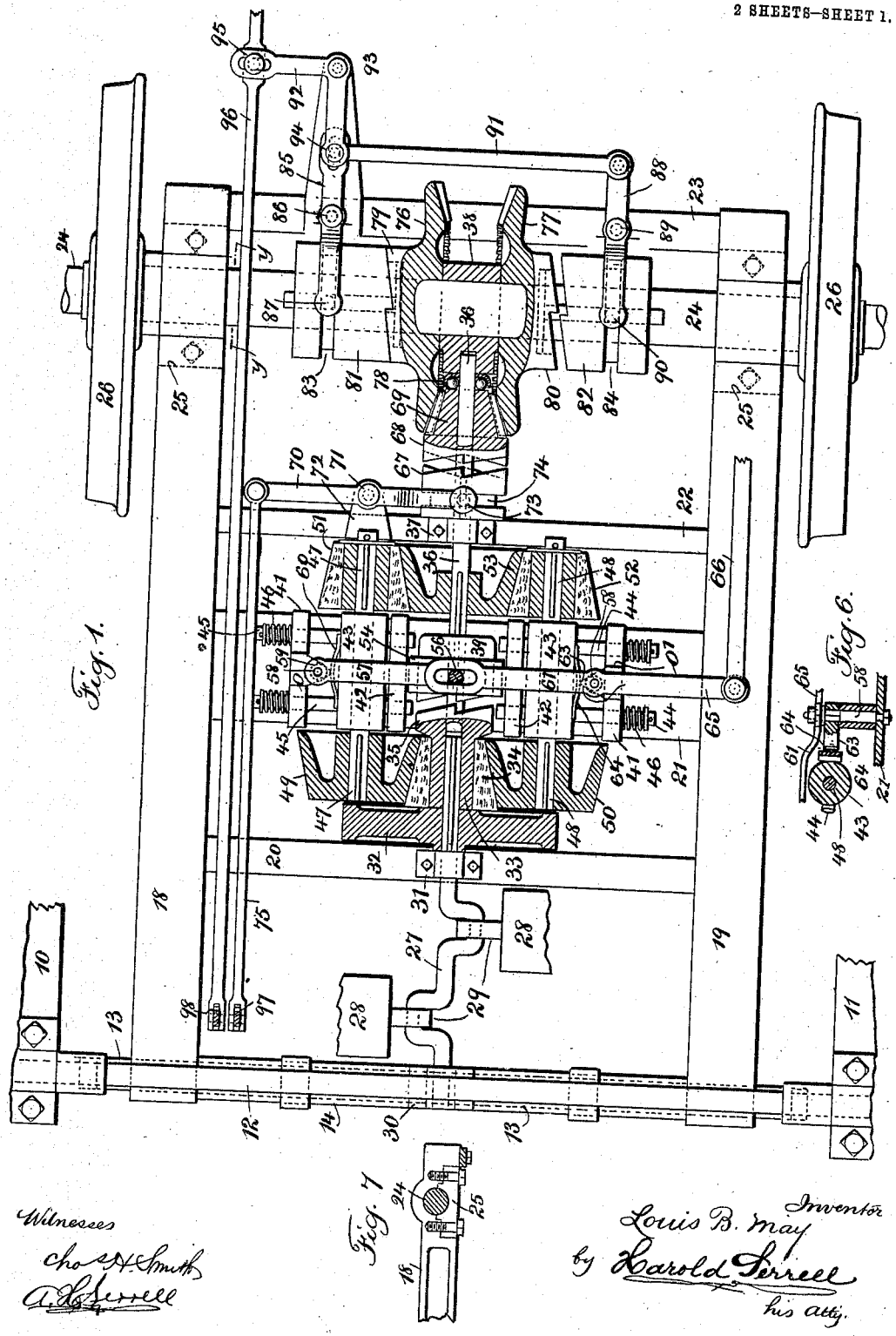

L. B. MAY.
POWER TRANSMISSION DEVICE.
APPLICATION FILED JAN. 2, 1909.
981,096.
Patented Jan. 10, 1911.
2 SHEETS—SHEET 2.
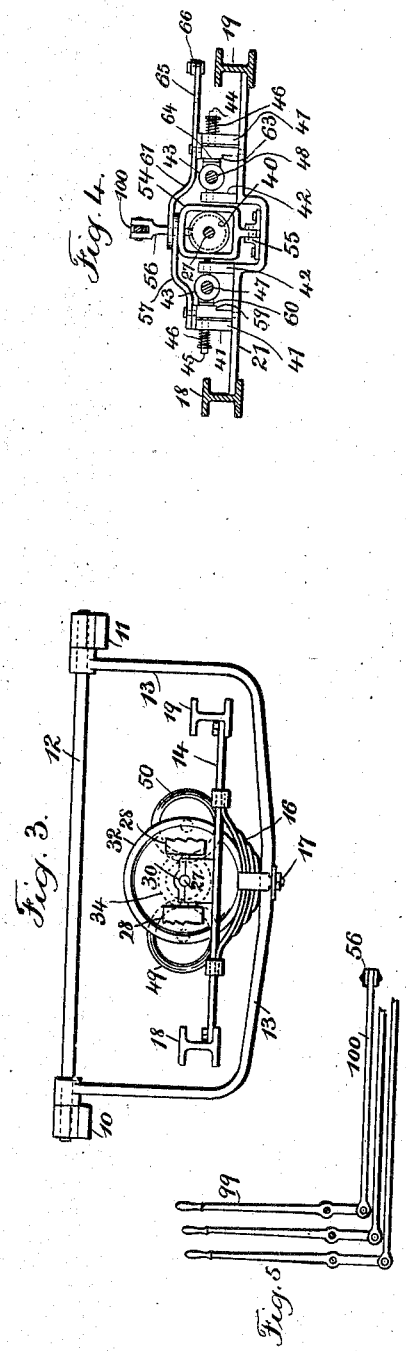
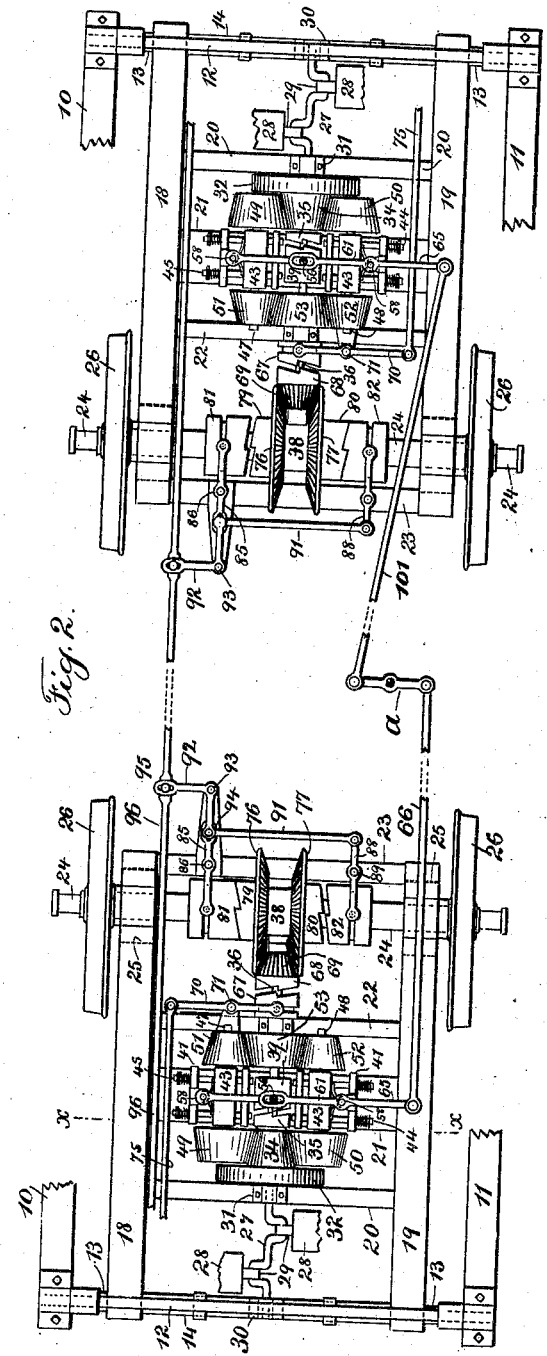
Witnesses
Chas. J. Smith
A. L. Serrell
Inventor
Louis B. May.
by Harold Serrell
his atty

UNITED STATES PATENT OFFICE.

LOUIS B. MAY, OF NEW YORK, N. Y.

POWER-TRANSMISSION DEVICE.

981,096.

Specification of Letters Patent.  Patented Jan. 10, 1911.

Application filed January 2, 1909. Serial No. 470,425.

*To all whom it may concern:*

Be it known that I, LOUIS B. MAY, a citizen of the United States, residing in the borough of Manhattan, city, county, and State of New York, have invented an Improvement in Power-Transmission Devices, of which the following is a specification.

My present invention is an improvement in power transmission devices and pertains more especially to that class of such devices which embraces self-contained units.

My present improvement relates particularly to a self-contained transmission device adapted for use on heavy trucks, street cars and similar purposes, and the object thereof is the provision in such a device of a three-point suspension frame supporting the working parts in order to take up or absorb the vibrations thereof, in so far as the same is possible, and further to provide a clutch intermediate of a prime mover and a driven shaft which may be connected and disconnected so as to drive through the clutch or directly from the prime mover, and in carrying out my invention, I also provide means for reversing the driven shaft without affecting the operation of the prime mover, as will be hereinafter more particularly described.

In the drawing, Figure 1 is a plan and partial cross section of a transmission apparatus embodying my present invention and illustrating the use thereof in connection with a single drive. Fig. 2 is a plan view illustrating my invention as applied at both ends of a vehicle truck. Fig. 3 is an elevation taken at the left hand end of Fig. 2. Fig. 4 is a section on line x, x, Fig. 2,—Figs. 3 and 4 being on a different scale from Fig. 2. Fig. 5 is an elevation of the levers which may be employed to operate the apparatus. Fig. 6 is a partial sectional elevation illustrating a modified form of the manner of connecting the levers which operate the clutch mechanism, and Fig. 7 is a section on line y—y, Fig. 1, on a reduced scale.

I have illustrated my invention as applicable to the trucks of vehicles, and referring particularly to the drawing, 10 and 11 indicate the side rails of a car truck in and adjacent to one end of which a hanger shaft 12 is suitably journaled. Connected to and depending from this hanger shaft 12 is a U-shaped bar 13.

14 designates a cross piece provided with suitably spaced apart blocks in which are connected the extremities of a spring 16, the spring 16 being centrally secured to the central portion of the U-shaped bar 13 by means of straps and bolts 17 or otherwise.

18, 19 represent I-beams which are connected suitably to the cross piece 14 and to which are also secured the cross pieces indicated at 20, 21, 22 and 23.

The driven shaft or wheel axle of the truck is indicated at 24 and the sides of the I-beams 18, 19, in corresponding positions are preferably recessed to receive the bearings in which the wheel axle 24 is journaled, the depending parts being preferably secured in position by the caps 25, and the axle 24 is provided in the customary manner with wheels 26, it being understood that the I-beams 18, 19, with the respective cross pieces 14, 21, 22, and 23, comprise a frame which has a two-point bearing or support at one end thereof on the bearings in which the wheel axle is journaled and a one point support under the spring 16 at the opposite end thereof, so that within certain limits this frame which supports the working parts is permitted to have a swinging vibrating motion in order to take the vibrations of the said working parts in so far as the same is possible. Suitably mounted on this three point support frame and preferably at one end thereof adjacent to the U-shaped bar 13, I employ a prime mover, which as will be understood may be a gasolene or other hydrocarbon engine or other apparatus. In the drawing I have illustrated this prime mover diagrammatically and 27 indicates the drive or crank shaft thereof, 28 the cylinders which may be any desired number commonly employed in similar engines for particular purposes and 29 represents the piston rods which are connected to and drive the crank shaft 27.

At one end the crank shaft 27 is mounted in a bearing 30 carried by the cross piece 14 and on the other side of the cranks thereof, the crank shaft operates in a bearing 31 supported on and connected to the cross-piece 20, adjacent to which there is a fly-wheel 32 on the drive shaft. Adjacent to the fly-wheel 32, the drive shaft is also provided with a sleeve 33 connected to the shaft in any desired manner and provided at its outer end with a clutch member 35 and surrounding the sleeve 33 there is a friction cone clutch member 34.

36 designates an intermediate shaft working in a bearing 37 supported on the cross-piece 22 and having one end adjacent to the end of the drive shaft and the other end having a bearing in a sleeve 38 surrounding the wheel axle 24. This intermediate shaft is provided with a clutch member 39 which is revoluble therewith and slidable thereon and adapted to engage the clutch member 35. Surrounding the clutch member 39 is a rocker frame 54 hinged at 55 in a depending portion of the cross piece 21 provided for this purpose and the clutch member 39 is provided with a peripheral recess 40, the function of which will be hereinafter described.

On the cross piece 21 and preferably in similar positions on opposite sides of the center thereof, there are provided standards 41, 42, between each of which there is a sleeve member 43, each provided with rods 44, 45, extending respectively in opposite directions from diametrically opposite points on the said sleeves 43, and 46 indicates springs which are employed to normally maintain the said sleeves 43 and the hereinafter described parts connected therewith against suitable stops provided for this purpose. In one of the sleeves 43 there is journaled a cone-shaft 47 and similarly in the other sleeve 43 is journaled a cone-shaft 48. On one extremity of the cone-shaft 47 there is provided a friction cone 49 and on the corresponding end of the cone shaft 48 there is a similar friction cone 50, the friction cones 49 and 50 being adapted to contact with and engage the friction cone 34. On the opposite end of the cone-shaft 47 there is a friction cone 51 and on the corresponding end of the cone-shaft 48 there is a similar friction cone 52 and between the friction cones 51 and 52 there is mounted on the intermediate shaft 36 a friction cone indicated at 53 with which the friction cones 51 and 52 are adapted to contact and engage. The arrangement of these parts is preferably such that in driving the intermediate shaft 36 from the drive shaft 27 through the cone clutch, there is a reduction in speed in approximately the proportion of 10 to 7.

Connected with the upper member of the swinging frame 54 is a pin 56, the lower end of which engages the peripheral groove 40 in the clutch member 39, while the upper end of this pin passes through elongated slots provided therefor in the adjacent and overlapping ends of the levers 57 and 61. The opposite end of the lever 57 is pivotally connected as indicated at 58 to a plate o above the standard 41 and this lever is provided with a cam 59 adapted to contact with a spring 60 on the outer surface of the adjacent sleeve 43, while the lever 61 is pivotally connected as indicated at 62 in a plate o' above the other standard 41 and the lever 61 is provided also with a cam 63 adapted to bear against a spring 64 on the other sleeve 43, and the free end 65 of the lever 61 is pivotally connected to a rod 66. Now the hereinbefore described parts are so arranged that when the rod 66 is moved to the left hand from the position shown in Fig. 1, the adjacent overlapping ends of the levers 57 and 61 will be moved to the right, thereby causing the cams 59 and 63 to slide on the surfaces of their respective springs 60 and 64, whereby the springs 46 will be brought into play to move the sleeves 43 outwardly and so disengage the friction cones 49 and 50 from the cone 34, and the cones 51 and 52 from the cone 53, thereby releasing the clutch, whereas in the opposite movement of the rod 66 these parts will be returned to the position shown in Fig. 1, thereby throwing in the friction cones and turning the intermediate shaft 36 by means of the drive shaft 27 through the intervention of the friction cones, and upon a further movement to the right of the rod 66, the adjacent overlapping ends of the levers 57 and 61 will be further moved toward the left, again removing the cams from contact with their respective springs and so releasing the friction clutch and at the same time throwing the clutch member 39 into engagement with the clutch member 35, this latter operation being effected by the pin 56 which as hereinbefore stated, is connected to the swinging frame 54 and has one end extending through the apertures in the levers 57 and 61, and the opposite end in engagement with the peripheral groove 40 in the clutch member 39.

On the intermediate shaft 36 I employ a clutch member 67 which is revoluble therewith and is adapted to slide thereon and adjacent to the clutch member 67 is a clutch member 68 mounted freely on the intermediate shaft 36 and adapted to be engaged by the clutch 67. Connected to the clutch member 68 or made integral therewith, is a bevel gear 69 and the clutch member 67 may be actuated by means of a lever 70 pivotally mounted at 71 in a bracket 72 connected to the cross-piece 22, one end of the lever 70 being bifurcated and provided with trunnions 73 adapted to run in a peripheral groove 74 provided therefor in the surface of the clutch member 67, while the opposite end of the lever 70 is preferably connected to a rod 75 by which the same is actuated.

On the wheel axle or driven shaft 24 and on both sides of the collar 38 thereon, I employ bevel gears 76 and 77, both of which are adapted to mesh with the bevel gear 69 connected to the clutch member 68 and associated with the adjacent end of the intermediate shaft I employ also a thrust bearing indicated at 78. The gear 76 is provided with a clutch member 79 and similarly the gear 77 is provided with a clutch member 80 and these gears with their respective clutch members are mounted to turn freely on the driven shaft 24 and on the shaft 24 and adjacent to the clutch member 79, I provide a clutch member 81 which is revoluble with the driven shaft and slidable thereon. Similarly on the other side of the gear 77, there is a clutch member 82 also revoluble with the shaft and slidable thereon. The clutch member 81 is adapted to engage the clutch member 79 and is provided with a peripheral groove 83 and the clutch member 82 is adapted to engage the clutch member 80 and is provided with a peripheral groove 84.

85 designates a lever pivotally mounted as indicated at 86 in the cross piece 23; one end of the lever 85 is bifurcated and provided with trunnions 87 adapted to run in the peripheral groove 83. 88 also designates a lever pivotally mounted at 89 in the cross piece 23 and one end of this lever is also bifurcated and provided with trunnions 90 adapted to run in the peripheral groove 84 of the surface of the clutch member 82. The opposite ends of the levers 85 and 88 are connected by a rod 91, and 92 designates a bell crank lever pivotally mounted at 93 in a bracket secured to the cross piece 23. One end of the bell crank lever is connected to the lever 85 and the rod 91 as indicated at 94 and the other arm of the bell crank lever 92 is pivotally connected as indicated at 95 to a rod 96, the movement of which through the intervention of the bell crank lever, the lever 85, the rod 91 and the lever 88, moves the said clutch members 81 and 82 simultaneously either in one direction or the other.

By reference to Fig. 5, the rod 75 is connected to a lever 97, the rod 96 to a lever 98,—and 100 designates a rod connected at one end to a lever 99 and at the opposite end to the pin 56.

Now in the operation of the hereinbefore described transmission device, assuming that the prime mover is running, the lever 97 is first thrown to throw in the clutch members 67 and 68 in order to positively connect the intermediate shaft 36 with the gears 69, 76, and 77, whereupon the lever 99 is thrown to an intermediate position to first throw in the reduction friction gearing to the position shown in Fig. 1 and if desired, the lever 99 may be thrown to the opposite position to release the friction gearing and throw in the clutch members 35 and 39 in order to drive directly from the prime mover and also the lever 98, as will be understood, may be thrown to actuate the clutch members 80 and 81 throwing the same in either one direction or the other depending upon the direction of travel of the vehicle and as indicated in the drawing, either one or the other of these clutches 81, 82, will be in engagement at all times with its corresponding clutch member 79 or 80, it being also understood that it is preferable to throw out the clutch members 67, 68 before applying the reversing clutch 98.

The transmission device hereinbefore described has had particular reference to a vehicle provided with a single unit, but it will be manifest that a suitable vehicle may be provided with a multiplicity of units, as for instance, as is illustrated in Fig. 2, wherein is shown a transmission unit at each end of the vehicle, each unit being complete and operative in and of itself and entirely independent of the other and in this form of construction, the rod 96 connecting the reversing lever, is merely extended and connected with a similar lever at the opposite end of the apparatus, whereas the rod 66 for starting the vehicle is connected to a rod 101 by means of a lever indicated at $a$, these rods 66 and 101 being actuated, as will be understood by the starting lever 99, one of which is provided at each end of the vehicle. It will also be understood that in the use of the double unit, it will be necessary to provide a duplicate of the lever 97 at the opposite end of the vehicle for throwing in the members 67, 68, of the clutch at that end of the vehicle. Furthermore it may be desirable to provide means not shown for locking the reversing levers at both ends of the vehicle, so that the operation of the lever will require the attention simultaneously of two attendants and the same means may be made to lock the other levers in position when not in use. And also, as is manifest, where a single unit is employed, the extensions 65 of the levers 61 as well as the rods 66, 101, and the lever $a$, may be dispensed with.

I claim as my invention:

1. In a power transmission apparatus, a prime mover, a driven shaft, gear shafts, a plurality of gears on each gear shaft and means in the continued operation of which in one direction the said gear shafts and gears thereon are first simultaneously moved toward the said driven shaft, are then simultaneously moved away from the driven shaft and simultaneously with the said second movement of the said gear shafts and gears, the said driven shaft is connected directly to the said prime mover.

2. In a power transmission apparatus, a prime mover, a driven shaft, a device for directly connecting the prime mover and driven shaft, gear shafts, a plurality of gears on each gear shaft and means in the continued operation of which in one direction the said gear shafts and gears thereon are first simultaneously moved toward the said driven shaft, are then simultaneously moved away from the driven shaft and simultaneously with the said second movement of the said gear shafts and gears, the said device is actuated to directly connect the said prime mover and driven shaft.

3. In a power transmission apparatus, a prime mover, a drive shaft, a driven shaft in alinement therewith, a gear on the drive shaft, a gear on the driven shaft, a plurality of gear shafts, gears on each of the said gear shafts adapted to engage respectively with the said gears on the drive shaft and on the driven shaft, and means in the continued movement of which in one direction, the said gear shafts are shifted simultaneously toward the said drive shaft and driven shaft to bring the said gears into contact, then said gear shafts are shifted simultaneously in the opposite direction to separate the said gears, and simultaneously therewith the said drive and driven shafts are directly connected.

4. In a power transmission apparatus, a prime mover, a drive shaft, a driven shaft in alinement therewith, a gear on the drive shaft, a gear on the driven shaft, a plurality of gear shafts, gears on each of the said gear shafts adapted to engage respectively with the gears on the drive and driven shafts, a device for directly connecting the said drive and driven shafts, and means in the continued movement of which in one direction, the said gear shafts are first shifted simultaneously toward the said drive and driven shafts to bring the said gears into contact, the said gear shafts are then shifted simultaneously in the opposite direction to separate the said gears and simultaneously therewith the said device is actuated to directly connect the said drive and driven shafts.

5. In a power transmission apparatus, a prime mover, a drive shaft, a driven shaft in alinement therewith, a clutch for directly connecting the driven shaft to the drive shaft, a friction pulley on the said drive shaft, a friction pulley on the said driven shaft, a plurality of pulley shafts, friction pulleys on each of the said pulley shafts, and means in the continued movement of which in one direction, the said pulley shafts are first simultaneously shifted to bring the said pulleys thereon into contact with the pulleys on the drive and driven shafts respectively, are then simultaneously shifted in the opposite direction to separate the said pulleys and simultaneously therewith the said clutch is actuated to directly connect the said drive and driven shafts.

6. In a power transmission apparatus, a prime mover, a driven shaft, a drive shaft, a device for connecting and disconnecting the driven shaft directly to the drive shaft, a friction pulley on the drive shaft, a friction pulley on the driven shaft, pulley shafts, bearings for the same and with which the said pulley shafts are slidable toward and away from the said driven shaft, friction pulleys on each of the said pulley shafts adapted to contact respectively with the said friction pulleys on the drive and driven shafts, and means in the continued movement thereof in one direction, the said pulley shafts and the pulleys thereon are simultaneously shifted toward the driven shaft to bring the friction pulleys on the pulley shafts into contact with the friction pulleys respectively on the drive and driven shafts, then said pulley shafts are simultaneously shifted away from the driven shaft to separate the said friction pulleys and simultaneously therewith said device is actuated to directly connect the driven shaft to the drive shaft.

7. In a power transmission apparatus, a prime mover, a driven shaft, a drive shaft, a device for connecting and disconnecting the driven shaft directly to the drive shaft, a friction pulley on the drive shaft, a friction pulley on the driven shaft, pulley shafts, bearings for the same and with which the said pulley shafts are simultaneously slidable toward and away from the said driven shaft, friction pulleys on each of the said pulley shafts adapted to contact respectively with the said friction pulleys on the drive and driven shafts, means in the continued movement thereof in one direction, the said pulley shafts and the pulleys thereon are simultaneously shifted toward the driven shaft to bring the friction pulleys on the pulley shafts into contact with the friction pulleys respectively on the drive and driven shafts, then said pulley shafts are simultaneously shifted away from the driven shaft to separate the said friction pulleys and simultaneously therewith the said device is actuated to directly connect the driven shaft to the drive shaft, and means for normally maintaining the friction pulleys on the said pulley shafts out of contact with the pulleys on the said driven and drive shafts respectively.

8. In a power transmission apparatus, a prime mover, a driven shaft, a drive shaft, a device for connecting and disconnecting the driven shaft directly to the drive shaft, a friction pulley on the drive shaft, a friction pulley on the driven shaft, pulley shafts, bearings for the same, rods connected to and extending from the said bearings, slide-ways in which the said rods, bearings, pulley shafts and the pulleys thereon are simultaneously movable toward and away from the driven shaft, means for normally maintaining the pulleys on the pulley shafts out of contact with the pulleys on the drive and driven shafts, and means in the continued movement of which in one direction, the said bearings, pulley shafts and pulleys thereon are simultaneously moved toward the driven shafts to cause the pulleys on the pulley shafts to contact with the pulleys on the drive shaft and driven shaft, are then simultaneously moved in the opposite direction and simultaneously therewith the said device is actuated to directly connect the driven shaft to the drive shaft.

9. In a power transmission apparatus, a prime mover, a driven shaft, a drive shaft, a clutch for connecting and disconnecting the driven shaft directly to the drive shaft, a friction pulley on the drive shaft, a friction pulley on the driven shaft, pulley shafts, bearings for the same, rods connected to and extending from the said bearings, slideways in which the said rods, bearings, pulley shafts and the pulleys thereon are movable toward and away from the driven shaft, means for normally maintaining the pulleys on the pulley shafts out of contact with the drive and driven shafts, a spring connected to each of the said bearings, a cam adapted to contact with the face of each of the said springs and means for simultaneously operating said cams and the said clutch in such a manner that the said pulley shafts with their friction pulleys are first moved toward the driven shaft to cause the friction pulleys to come into contact, are then moved in the opposite direction to disengage the friction pulleys and to throw in the said clutch to directly connect the said driven and drive shafts.

10. In a power transmission apparatus, a prime mover, a driven shaft, a drive shaft, a clutch for connecting and disconnecting the driven shaft directly to the drive shaft, a friction pulley on the drive shaft, a friction pulley on the driven shaft, pulley shafts, bearings for the same, rods connected to and extending from the said bearings, slideways in which the said rods, bearings pulley shafts and the pulleys thereon are movable toward and away from the driven shaft, levers for normally maintaining the pulleys on the pulley shafts out of contact with the drive and driven shafts, a spring connected to each of the said bearings, a cam adapted to contact with the face of each of the said springs and means for simultaneously operating said cams and the said clutch in such a manner that the said pulley shafts with their friction pulleys are first moved toward the driven shaft to cause the friction pulleys to come into contact, are then moved in the opposite direction to disengage the friction pulleys and to throw in the said clutch to directly connect the said driven and drive shafts.

Signed by me this 23rd day of Dec., 1908.

LOUIS B. MAY.

Witnesses:
C. C. WILSON,
CLOYD MARSHALL.